United States Patent

Chaffanjon

[11] Patent Number: 5,497,142
[45] Date of Patent: Mar. 5, 1996

[54] DIRECTIONAL SEPARATOR-COUPLER CIRCUIT FOR MEDIUM-FREQUENCY CARRIER CURRENTS ON A LOW-VOLTAGE ELECTRICAL LINE

[75] Inventor: Daniel Chaffanjon, Montgeron, France

[73] Assignee: Electricite de France, Paris, France

[21] Appl. No.: 66,117

[22] PCT Filed: Oct. 15, 1992

[86] PCT No.: PCT/FR92/00976

§ 371 Date: Jun. 4, 1993

§ 102(e) Date: Jun. 4, 1993

[87] PCT Pub. No.: WO93/08653

PCT Pub. Date: Apr. 29, 1993

[30] Foreign Application Priority Data

Oct. 17, 1991 [FR] France .................. 91 12821

[51] Int. Cl.$^6$ ................................. H04M 11/04
[52] U.S. Cl. .................. 340/310.06; 340/310.01; 340/310.07; 307/140
[58] Field of Search .................. 340/310.06, 310.07, 340/310.01, 310.02, 310.05, 538; 307/140

[56] References Cited

U.S. PATENT DOCUMENTS

| 3,702,460 | 11/1972 | Blose | 340/310.07 |
| 3,924,223 | 12/1975 | Whyte et al. | 340/310.05 |
| 4,371,867 | 2/1983 | Gauder | 340/310.02 |
| 4,383,243 | 5/1983 | Krügel | 340/310.02 |
| 4,408,186 | 10/1983 | Howell | 340/310.07 |
| 4,668,934 | 5/1987 | Shuey | 340/310.02 |
| 4,885,563 | 12/1989 | Johnson et al. | 340/310.06 |
| 4,903,006 | 2/1990 | Boomgaard . | |
| 4,973,940 | 11/1990 | Sakai et al. | 340/310.02 |
| 5,066,939 | 11/1991 | Mansfield, Jr. | 340/310.02 |

FOREIGN PATENT DOCUMENTS 141673  5/1985  European Pat. Off. .
2306572 10/1976 France .

Primary Examiner—Brent A. Swarthout
Assistant Examiner—Nina Tong
Attorney, Agent, or Firm—Larson and Taylor

[57] ABSTRACT

A directional separator-coupler circuit is provided for a medium-frequency carrier current on an electrical line of a low-voltage alternating current network. The separator-coupler circuit comprises a parallel resonant circuit (C,L) inserted into the electrical line and a circuit (E) for the transmission-reception of the carrier currents which are voltage-coupled to the resonant circuit by a connecting circuit (D). The connecting circuit also comprises a series connecting branch ($L_d$, $C_d$) which enables current coupling of the transmission-reception circuit (E) and the medium-frequency line, as well as decoupling thereof.

10 Claims, 4 Drawing Sheets

5,497,142

DIRECTIONAL SEPARATOR-COUPLER CIRCUIT FOR MEDIUM-FREQUENCY CARRIER CURRENTS ON A LOW-VOLTAGE ELECTRICAL LINE

BACKGROUND OF THE INVENTION

1. Field of the Invention

The invention relates to a directional separator-coupler circuit for medium-frequency carrier currents on an electrical line of the low-voltage alternating network.

2. The Prior Art

The transmission of information on networks for distribution and supply of low-voltage electrical energy is currently carried out by means of transmitter-receiver circuits with carrier currents E, which are coupled to the network, as represented in FIG. 1a, by means of a separator-coupler circuit D, so as to provide maximum coupling to the low-voltage network and minimum disturbance both to the network itself, called upstream network, and to the downstream network, most often consisting of the power supply installation of a subscriber customer. This type of coupler separator circuit must, on the one hand, provide matching of the transmitter-receiver circuit E, and, on the other hand, decoupling between the upstream network and the downstream network. For this purpose, a voltage coupling, by means of a transmitter coupling transformer, has been used up until now as separator-coupler circuit, as represented in FIG. 1b; the low-voltage circuits with carrier currents being thus completely separated galvanically. Such circuits give satisfaction from the point of view of decoupling of direct or homopolar current, but they do not make it possible, however, to produce a true directional coupler circuit.

SUMMARY OF THE INVENTION

The object of the present invention is the implementation of a directional separator-coupler circuit making it possible to provide maximum decoupling between the transmitter-receiver E and the downstream network B while the coupling between the same transmitter-receiver E and the upstream network A is optimum.

Another object of the present invention is the implementation of a directional separator-coupler circuit in which the abovementioned directional sense may be reversed, maximum decoupling between transmitter-receiver E and upstream network A and optimum coupling between transmitter-receiver E and downstream network B.

Another object of the present invention is also the implementation of a separator-coupler circuit making it possible to provide effective filtering of the parasitic signals, originating from the downstream network B, and capable of propagating towards the upstream network A and the transmitter-receiver E or vice versa.

The directional separator-coupler circuit for medium-frequency carrier currents on an electrical line of the low-voltage alternating network, which is the subject of the present invention, comprises a parallel resonant circuit inserted into the electrical line, whose resonance frequency is close to the central frequency of the pass band of the medium-frequency carrier currents, and a circuit for transmission-reception of said carrier currents voltage-coupled to said resonant circuit by a connecting circuit. It is noteworthy in that the connecting circuit also comprises a series connecting branch making it possible to provide a current coupling for the transmission-reception circuit and for the medium-frequency line and decoupling of the transmission-reception circuit from the line at the frequency of the low-voltage network.

The directional separator-coupler circuit, which is the subject of the invention, finds an application in the production of systems for transmission of information by medium-frequency carrier currents on low-voltage electrical energy power supply networks.

BRIEF DESCRIPTION OF THE DRAWINGS

A more detailed description of a directional separator-coupler circuit, subject of the present invention, will now be given below in connection with the drawings in which, over and above FIGS. 1a and 1b which relate to separator-coupler circuits of the prior art.

DESCRIPTION OF THE PREFERRED EMBODIMENTS

A more detailed description of a directional separator-coupler circuit in accordance with the object of the present invention will now be given in connection with FIG. 2.

Figure 1A:
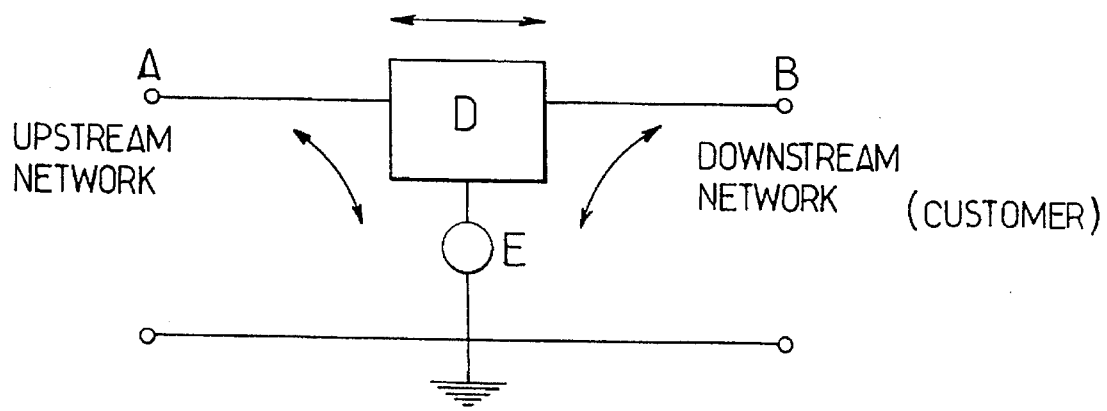
Figure 1B:
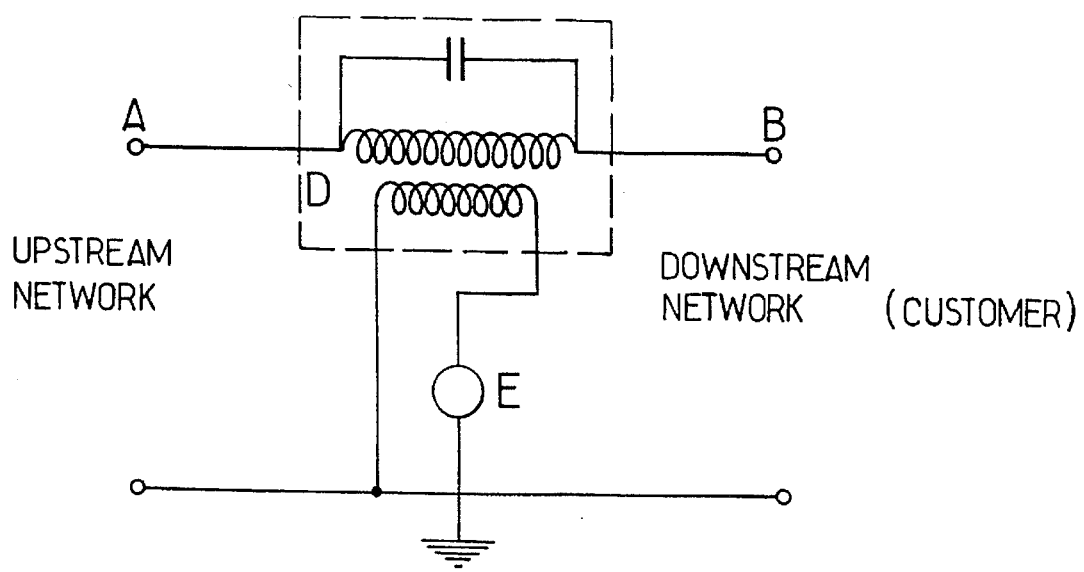
Figure 2:
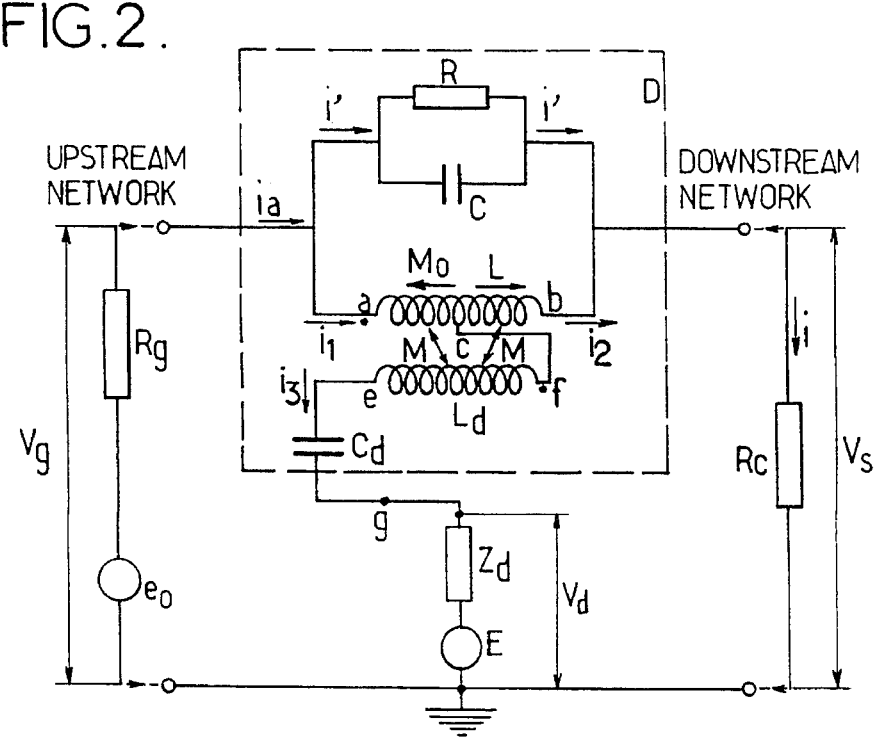
FIG. 2 represents a directional separator-coupler circuit in accordance with the object of the present invention.

As represented in the abovementioned FIG. 2, the directional separator-coupler circuit, the subject of the present invention, is intended to provide transmission of medium-frequency carrier currents on an electrical line of the low-voltage alternating network.

It comprises a parallel resonant circuit formed by an inductor L, a capacitor C and a resistor R, this resonant circuit being inserted into the abovementioned electrical line. The resonance frequency of the parallel resonant circuit is close to the central frequency of the pass band of the medium-frequency carrier currents. In operation, a transmission-reception circuit E for the carrier currents is voltage-coupled to the resonant circuit by a connecting circuit. In accordance with a particularly advantageous aspect of the present invention, the connecting circuit also includes a series connecting branch, formed by an inductor $L_d$ and a capacitor $C_d$ connected in series, the branch for connecting in series being connected directly to a winding of the inductor L and voltage coupling being produced by mutual coupling of the inductor L and of the inductor $L_d$. The transmission-reception circuit E is then connected by a current coupling between the capacitor $C_d$ and the reference voltage or earth of the device and of the network. The branch for connecting in series makes it possible to provide current coupling of the transmission-reception circuit E and of the medium-frequency line and decoupling of the transmission-reception circuit E from the line, at the frequency of the low-voltage network, as will be explained below in the present description.

According to a particularly advantageous aspect of the coupler separator circuit which is the subject of the present invention, the connecting circuit is formed by the auxiliary inductor $L_d$ coupled by mutual inductance with the inductor L of the parallel resonant circuit, this auxiliary inductor $L_d$ thus providing voltage coupling of the transmitter circuit E to the abovementioned resonant circuit. Moreover, an auxiliary capacitor $C_d$ provides the link between the first end of the auxiliary inductor $L_d$ and the transmission-reception circuit E. Finally, a direct-current electrical link circuit is provided between the other end of the auxiliary inductor $L_d$ and the midpoint of the inductor L of the parallel resonant circuit.

Thus, the direct-current electrical link circuit, the auxiliary inductor $L_d$ and the auxiliary capacitor $C_d$ constitute the branch for connecting the transmission-reception circuit of the low-voltage energy distribution network in series.

The operation of the directional separator-coupler circuit, subject of the present invention, may be summarized in the manner below:

ON TRANSMISSION:

The transmitter is represented by an electromotive force E and its internal impedance denoted $Z_d$. The voltage available at point g, that is to say at the input point of the separator-coupler which is the subject of the present invention, is applied to the electrical network at point c, the midpoint of the main inductor L forming the parallel resonant circuit interposed in the low-voltage distribution circuit. The voltage available at point g is applied to the abovementioned midpoint c by means of the capacitor $C_d$ and of the auxiliary inductor $L_d$.

The capacitor $C_d$ is chosen so as to partially isolate the transmitter-receiver E from the effects due to the presence of the 50 Hz voltage delivered by the power supply network, the current due to the 50 Hz component in the connecting branch and, in particular, in the internal impedance of the generator E which can then be made less than 150 mA.

The auxiliary inductor $L_d$ induces, in the main inductor L, connected between points a and b represented in FIG. 2, a medium-frequency voltage $V_a-V_c$, proportional to the medium-frequency current denoted is in $i_3$ in FIG. 2.

The ends of the auxiliary inductor $L_d$ being denoted respectively f and e, the end f being connected by the direct-current connection to the mid-point c of the main inductor L, a vectorial composition, on the one hand, of the voltage $V_a-V_c$ and of the voltage $V_f-V_e$, and, on the other hand, of the voltage $V_b-V_c$ with the voltage $V_f-V_e$ makes it possible, for values suitable in magnitude and in sign of the coefficients of induction and of mutual induction M and especially of the mutual coupling $M_O$ in the two half-inductors $L_{ac}$ and $L_{cb}$ of the main inductor L, of the mutual coupling M between, on the one hand, the main half-inductor $L_{ac}$ and the auxiliary inductor $L_d$ and, on the other hand, the main half-inductor $L_{ab}$ and the auxiliary inductor $L_d$, to cancel the resultant medium-frequency voltage at point b, that is to say at the input of the downstream network, whereas this resultant voltage reaches a maximum at point a, that is to say at the input of the upstream network.

It will be noted that the separator-coupler circuit which is the subject of the present invention makes it possible to combine voltage coupling and current to provide the previously mentioned directional character.

It will be recalled that voltage coupling prevails when the impedance of the network is relatively high, greater than 10 ohms, whereas current coupling is preferred in the presence of low values of this impedance, i.e. less than 5 ohms.

It will also be noted that, even over a very short time, the low-voltage network sometimes fluctuates very greatly as far as impedance value is concerned, by a few tenths to a few tens of ohms, and it can therefore be understood that the mixed coupling offers a particularly propitious matching for the envisaged use. Moreover, the separator-coupler circuit which is the subject of the present invention makes it possible to confer on the carrier currents, on transmission, a directional character in a wide band of frequencies. In effect, on the one hand, it is possible to reinforce by up to $\neq$ dB the power transmitted towards the upstream network and, on the other hand, it is possible to eliminate, substantially with an attenuation of −20 dB, the undesirable signals originating from the downstream network. Needless to say, it will be noted that, on changing the direction of the relative winding of the main inductor L and of the auxiliary inductor $L_d$, the direction of transmission may be altered towards the downstream network or the upstream network respectively.

Finally, the directional separator-coupler circuit which is the subject of the present invention makes it possible to obtain a significantly enhanced performance, especially as far as the local signal/noise ratio is concerned, which is greater than 20 dB.

ON RECEPTION:

The upstream low-voltage network behaves like an electromotive force generator e with an internal impedance $R_g$. It delivers a voltage $V_g$ and a current with strength $i_A$ to the input of the separator-coupler circuit which is the subject of the present invention.

All the electromagnetic phenomena brought into play in the coupler-separator which is the subject of the present invention being reciprocal, the directional and matching properties described relative to transmission apply equally to reception, taking account of the fact that the input impedance $Z_d$ of the receiver is chosen so as to present a value which is much higher than that of the transmitter, 100 ohms instead of 10 ohms for example, so as to disturb the resultant impedance of the low-voltage network as little as possible. In effect, whereas at a given instant a single apparatus is transmitting, all the others, in contrast, are placed in receiving position and are thus practically in parallel.

The principle of overlaying equilibrium states applied to the separator-coupler circuit which is the subject of the present invention, as represented in FIG. 2, relative to the current $i_1$ flowing in the half-inductor $L_{ac}$ of the main inductor L, $i_2$ flowing in the half-inductor $L_{cb}$ of the main inductor L, $i_3$ flowing in the connecting circuit and in particular in the auxiliary inductor $L_d$, i flowing in the downstream network shown symbolically by a load resistor $R_c$, considering a first mesh formed by the upstream network, an impedance Z' formed by the capacitor C constituting the parallel resonant circuit and an attenuation resistor R', and the downstream network, a second mesh formed by the upstream network, the first half-inductor $L_{ac}$ of the main inductor L, the direct-current electrical link circuit and the transmission-reception circuit E, having regard to its internal impedance $Z_d$, and finally a third mesh formed by the same direct-current electrical link circuit and the transmission-reception circuit E having regard to its internal impedance $Z_d$, and the downstream network shown symbolically by the load resistor $R_e$, makes it possible to set out the matrix equation below:

$$\begin{bmatrix} E \\ E \\ -e \end{bmatrix} = \begin{bmatrix} a_{11} & a_{12} & a_{13} \\ a_{21} & a_{22} & a_{23} \\ a_{31} & a_{32} & a_{33} \end{bmatrix} \cdot \begin{bmatrix} i_1 \\ i_2 \\ i \end{bmatrix}$$

In the abovementioned relationship, the respective values will be noted:

$a_{11}=(R_g,0)$ $a_{12}=(-(R_g+x),-y)$ $a_{13}=(R_g+R_c+x,y)$ $a_{21}=(R_g,(L/4+2M+M_O)\Omega)$ $a_{22}=(-R_g,(L/4-2M+M_O)\Omega)$ $a_{23}=(R_c+R_g,0)$ $a_{31}=(Z_d, (L/4+2M+L_d)\Omega-1/C_d\Omega)$ $a_{32}=(x-Z_d, (M_O-L_d)\Omega+1/C_d\Omega)$ $a_{33}=(-(R_c+x),-y )$.

In the abovementioned relationships it will be noted that:

x and y respectively designate the real part and the imaginary part of Z' formed by R'//C, $\Omega$ designating the angular frequency of the carrier currents.

The foregoing relationships make it possible to establish the condition for which the coupling is such that the resultant voltage at b is substantially cancelled while the voltage reaches a maximum at point a.

In a practical embodiment, it will be noted that the resonant circuit is a relatively wide-band circuit, this resonant circuit exhibiting a Q coefficient $\leq 5$. This makes it possible to avoid having recourse to an inductance value which is prohibitive with respect to the effects produced on the 50 Hz voltage, an inductor with a value 5 times greater having to be used to obtain the same buffer impedance in the case in which no resonant circuit or tuning circuit is used. Moreover, the use of a tuned circuit with a relatively wide band makes it possible to limit the effects inherent in a too-heavily accentuated resonance, to tolerate a dispersion of the order of ±30% in the magnetic and electrical characteristics, in particular characteristics of the magnetic cores of the inductors used, and finally to accept correct transmission of signals whose spectrum is relatively wide, of the order of 10 kHz, which possess good properties with respect to the very numerous parasites of all types afflicting the electrical distribution network.

According to one embodiment, the auxiliary inductor $L_d$ and the main inductor L of the resonant circuit, mutually coupled, are formed by a transformer with a center-tapped secondary winding. The terminals of the secondary winding are linked in series to the upstream network and downstream network respectively, at the level of points a and b and in parallel to the capacitor C forming a resonant circuit. One of the terminals of the primary winding is connected by a direct-current electrical link to the abovementioned midpoint. Needless to say, the primary winding constitutes the auxiliary inductor $L_d$.

A more detailed description of an embodiment variant of the separator-coupler circuit which is the subject of the present invention will now be given in connection with FIG. 3.

In the abovementioned embodiment, the capacitor C constituting the resonant circuit is galvanically isolated from the low-voltage line, the capacitor C being coupled to the secondary winding of the center-tapped transformer by means of an additional winding forming an additional inductor $L_s$. Such an arrangement makes it possible to subtract the capacitor C and the damping resistor R' from the strong 50 Hz current. The additional winding $L_s$ may be produced in thin wire, for example.

Figure 3:
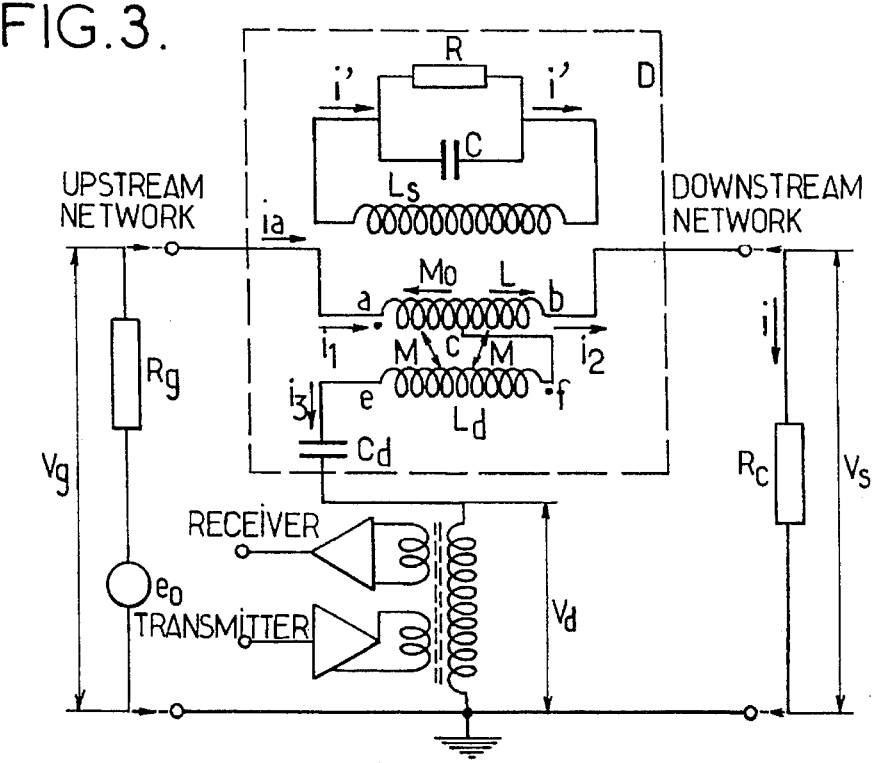
FIG. 3 represents a first embodiment variant of the directional separator-coupler circuit according to the invention as represented in FIG. 2.

Still in order to provide galvanic isolation with the low-voltage network, a small transformer with a ferrite pot or torus may be inserted between the point g and the earth point of the network so as to provide the link with the transmission-reception circuit as represented in FIG. 3. With a near-zero leakage flow, it is thus possible to correctly reflect in the secondary the very distinct values of the impedances of the transmitter and of the receiver. A limited number of turns makes it possible to further reduce the residual power transfer at 50 Hz to the receiver.

The increase in the pass band by the use of a damping resistor, the resistor R', exhibits the drawback of not altering the general shape of the response curve of the tuned circuit, which has the effect of relatively discriminating against the lateral components of the spectrum with respect to the central part of the latter.

Figure 4:
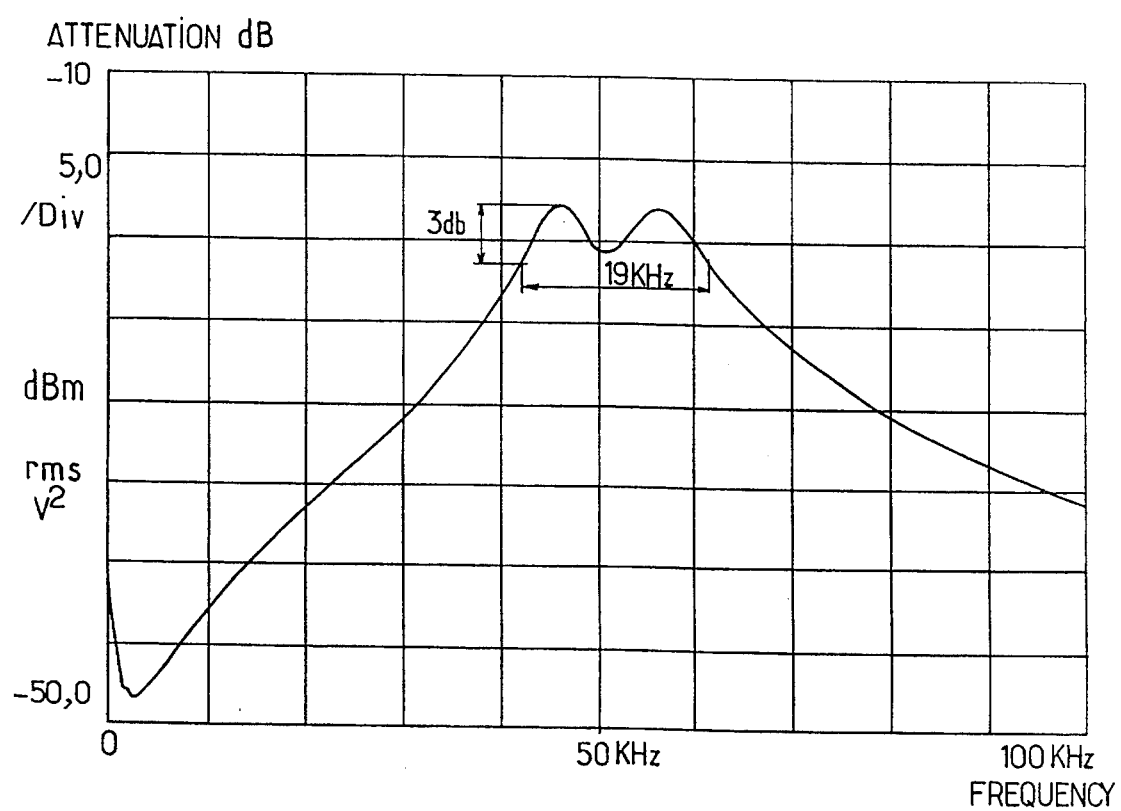
FIG. 4 represents a coupling diagram of an additional winding employed in the embodiment of FIG. 3 as a function of frequency.
Figure 5A:
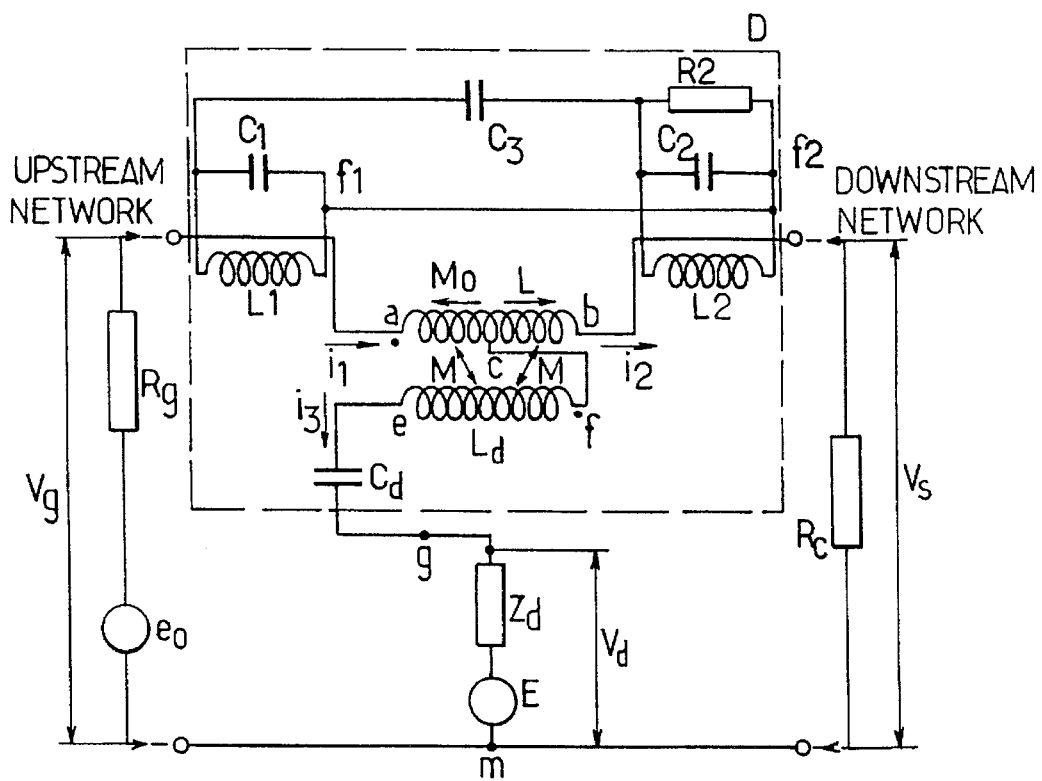
FIGS. 5A and 5B represents a second embodiment variant of the directional separator-coupler circuit according to the invention in which an increase in the pass band at medium frequencies is obtained.
Figure 5B:
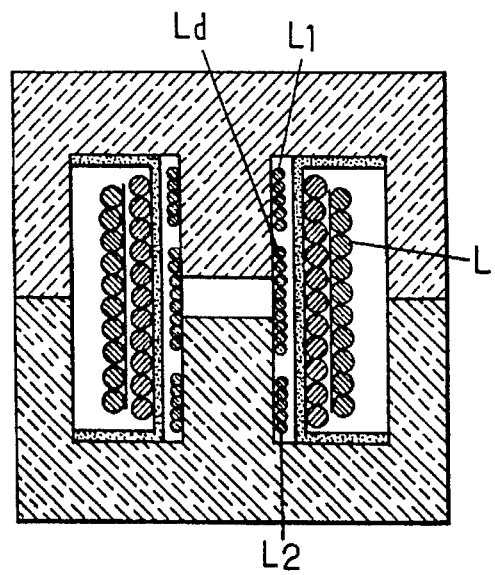

In order to remedy the abovementioned drawback, the frequency amplitude curve of the resonant circuit voltage-coupled to the connecting circuit exhibits two extrema substantially symmetric with respect to the central frequency of the pass band of the resonant circuit, so as to reinforce the contribution of the lateral frequencies of the frequency spectrum with respect to the central frequency of the latter. The frequency amplitude curve of the resonant circuit is, in this case, represented in FIG. 4. The abovementioned curve with symmetric extrema is obtained by supercritical coupling of the inductor L, the auxiliary inductor $L_d$ respectively with the additional winding $L_s$. The transformer may be represented by a transformer with a magnetic circuit having a wide gap, and a ferrite pot. The abovementioned curve is obtained by forming a gap of substantial thickness in the magnetic circuit. This gap essentially makes it possible to make use of the circuit to the best of its capabilities, having regard to the 50 Hz current of strength >95 amperes tending to saturate it. In these conditions, the internal leakage flow to the ferrite pot, for example, is then put to use to partially decouple two tuned circuits, as represented in FIG. 5, each circuit being tuned on a magnetic half-circuit. The decoupling complement is then provided by a precisely adjusted electrical connection between the two resonant circuits, as represented in the abovementioned FIG. 5. The resonant circuit is then subdivided into a first and a second elementary resonant circuit $L_1$, $C_1$, $L_2$, $C_2$. Each is tuned to a frequency $f_1$, $f_2$ respectively, with $f_1<f_2$, the frequencies $f_1$, $f_2$ respectively having substantially the value corresponding to the two symmetric extrema. The second elementary resonant circuit is furthermore damped by a resistor of value $R_2$ and the terminals of the first and second elementary resonant circuit are linked by a link capacitor $C_3$, the downstream terminals of the first and of the second elementary resonant circuit being linked by a direct-current link.

As has furthermore been represented in FIG. 5, the ferrite pot advantageously includes two E-shaped half-shells forming a wide gap in the region of the central area formed by the two assembled half-shells. The housing peripheral to the central area thus formed successively includes, from the central axis of the central area, the windings $L_1$, $L_2$ of the first and second elementary resonant circuits arranged symmetrically with respect to the gap. The winding of the auxiliary inductor $L_d$ is interposed between the windings of the first and second elementary resonant circuits. The winding of the inductor L of the resonant circuit or main inductor comes next on the windings $L_1$, $L_2$ and $L_d$.

Thus a directional separator-coupler device has been described, which has particularly high performance to the extent that it makes it possible to provide maximum decoupling between the downstream network and the carrier current transmitter-receiver while, in contrast, it makes it possible to provide maximum coupling of this same transmitter-receiver to the upstream network for example. A simple change in winding direction of one coil on the magnetic circuit of the previously described directional separator-coupler which is the subject of the present invention allows the direction to be reversed. Nevertheless, it is also possible to make use of two complemented magnetic circuits, one coupling with the upstream network and the other with the downstream network, each ending in a transmitter-receiver which is specific to itself, without departing from the scope of the subject of the present invention.

I claim:

1. A directional separator-coupler circuit for medium-frequency carrier currents on an electrical line of a low voltage alternating current network having a characteristic frequency, said circuit comprising a parallel resonant circuit connected in the electrical line and having a resonant frequency close to the central frequency of the pass band of the medium-frequency carrier currents, and a transmitter-receiver circuit for transmitting and receiving said carrier currents which is voltage coupled to said resonant circuit by a connecting circuit, said connecting circuit comprising a series connecting branch for current coupling said transmitter-receiver circuit to said line at said medium-frequency and for decoupling said transmitter-receiver circuit from said line at the characteristic frequency of the low-voltage alternating current network.

2. The directional separator-coupler circuit according to claim 1, wherein said parallel resonant circuit includes a capacitor connected in parallel with an inductor, and said connecting circuit comprises:

an auxiliary inductor, coupled by mutual inductance with said inductor of said resonant circuit, for providing the voltage coupling of said transmitter-receiver circuit to said parallel resonant circuit;

an auxiliary capacitor providing a connection between a first end of said auxiliary inductor and said transmitter-receiver circuit; and a direct current electrical link circuit between the to other end of said auxiliary inductor and the midpoint of said inductor of the resonant circuit, said direct current electrical link circuit, said auxiliary inductor and said auxiliary capacitor constituting said series connecting branch.

3. The directional separator-coupler circuit according to claim 2, wherein said auxiliary inductor and said inductor of the resonant circuit are formed by a transformer with a center-tapped secondary winding, the terminals of said secondary winding being connected in series with the line and in parallel with said capacitor forming said resonant circuit, said primary winding including a terminal connected by said direct current electrical link circuit to said mid-point of said inductor.

4. The directional separator-coupler circuit according to claim 3, wherein said capacitor of said resonant circuit is galvanically isolated from said network and is coupled to said secondary winding of said center-tapped transformer by means of an additional winding.

5. The directional separator-coupler circuit according to claim 4, wherein said resonant circuit has an amplitude-frequency curve which exhibits two extrema which are substantially symmetrical with respect to the central frequency of the pass band of said resonant circuit, so as to reinforce the contribution of the lateral frequencies of the frequency spectrum of said resonant circuit with respect to the central frequency of the pass band of said resonant circuit.

6. The directional separator-coupler circuit according to claim 5, wherein said curve with substantially symmetrical extrema is obtained by supercritical coupling of the inductor, the auxiliary inductor, and the additional winding, respectively, said transformer being a transformer with a magnetic circuit with a wide gap and with a ferrite pot.

7. The directional separator-coupler circuit according to claim 6, wherein said resonant circuit is subdivided into first and second elementary resonant circuits tuned to a first frequency f1, and to a second frequency, f2, respectively, with f1<f2, the frequencies f1, f2 having respective values substantially corresponding to the two substantially symmetric extrema, the second elementary resonant circuit being damped by a resistor of a predetermined value, upstream terminals of the first and second elementary resonant circuits being linked by a link capacitor and downstream terminals of the first and second elementary resonant circuits being linked by a direct-current link.

8. The directional separator-coupler circuit according to claim 7, wherein said ferrite pot includes two E-shaped half-shells forming a wide gap in the region of a central area formed by said half-shells, said central area defining a central axis, and portions of said transformer peripheral to said central area including successively, from the central axis of said central area:

windings, forming said first and second elementary resonant circuits arranged symmetrically with respect to the gap, the auxiliary inductor comprising a winding interposed between said windings of said first and second elementary resonant circuits; and a winding forming the inductor of said resonant circuit.

9. The directional separator-coupler circuit according to claim 1, wherein said resonant circuit exhibits a Q coefficient no greater than 5.

10. The directional separator-coupler circuit according to claim 1, wherein said resonant circuit has an amplitude-frequency curve which exhibits two extrema which are substantially symmetrical with respect to the central frequency of the pass band of said resonant circuit, so as to reinforce the contribution of the lateral frequencies of the frequency spectrum of said resonant circuit with respect to the central frequency of the pass band of said resonant circuit.

* * * * *